(No Model.)

M. A. FURBUSH.
SHAFT BEARING.

No. 296,684.          Patented Apr. 8, 1884.

Witnesses:
James F. Tobin
John E. Parker

Inventor
Merrill A. Furbush
by his Attys.
Howson and Sons

UNITED STATES PATENT OFFICE.

MERRILL A. FURBUSH, OF PHILADELPHIA, PENNSYLVANIA.

SHAFT-BEARING.

SPECIFICATION forming part of Letters Patent No. 296,684, dated April 8, 1884.

Application filed March 3, 1884. (No model.)

*To all whom it may concern:*

Be it known that I, MERRILL A. FURBUSH, a citizen of the United States, and a resident of Philadelphia, Pennsylvania, have invented certain Improvements in Bearings for Shafts, of which the following is a specification.

The main objects of my invention, which is fully described hereinafter, are, first, to provide for a shaft a bearing-block which can be readily detached from a hanger, bracket, or other analogous attachment when the removal of the shaft from its bearings becomes necessary; and, second, to provide means for accurately adjusting and firmly securing the hanger which carries the shaft.

Figure 1:
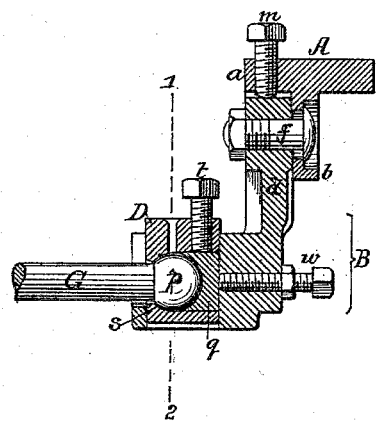
Figure 2:
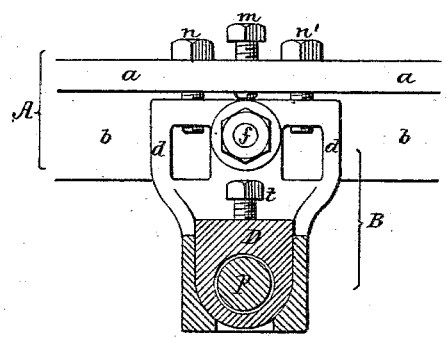
Figure 3:
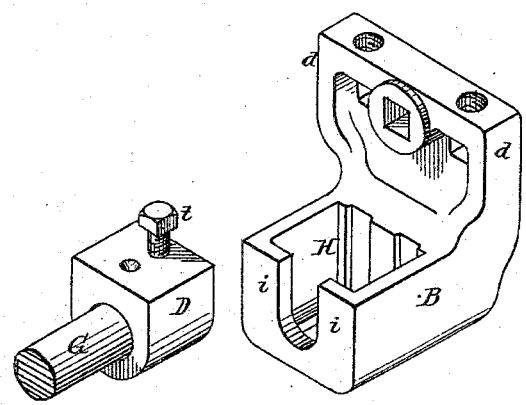

In the accompanying drawings, Figure 1 is a vertical section of a hanger and bearing-block made according to my invention; Fig. 2, a vertical section on the line 1 2, Fig. 1; Fig. 3, perspective views of the bearing-block and hanger detached from each other, and Fig. 4 a modification.

A is part of a frame, the construction of which may be varied as different applications of my invention may suggest; but in carrying out one feature of my said invention the frame should have two flanges, $a$ and $b$, arranged at right angles, or thereabout, to each other. The portion $d$ of a hanger, B, is secured to the flange $b$ of the frame A by a bolt, $f$, the opening in the flange being larger than the stem of the bolt, so as to permit the adjustment of the hanger, set-screws $n$ $n'$, between which is a binding-screw, $m$, being used for effecting this adjustment. The screw $m$ is adapted to a threaded opening in the flange $a$ of the frame and bears on the upper edge of the hanger, and each of the screws $n$ $n'$ passes freely through the said flange $a$, and is adapted to a threaded opening in the hanger. After loosening the nut of the bolt $f$ and the binding-screw $m$ the hanger may be adjusted vertically or swung laterally by the set-screws $n$ $n'$, after which the binding-screw may be tightened to prevent all vertical play of the hanger and bring the heads of the set-screws $n$ $n'$ to a tight bearing on the flange $a$ of the frame, the nut of the bolt $f$ being subsequently tightened, so as to cause the portion $d$ of the hanger to bear against the flange $b$, these two faces being properly trued, so that the hanger will be seated firmly on the frame.

In the hanger is a pocket, H, into which a bearing-block, D, fits snugly, but so as to be easily withdrawn, the front, $i$, of the pocket being recessed for receiving the shaft G. There is an opening in the bearing-block for receiving the spherical end $p$ of the shaft G and the follower $q$, the concave end of the latter and the concave portion $s$ of the bearing-block forming the socket for the spherical end of the shaft G. A set-screw, $w$, passing through the lower portion of the hanger, serves to so adjust the follower that there can be no play or rattling of the said spherical end of the shaft in its socket, the follower being confined to the bearing-block by a set-screw, $t$. The screw $w$ performs the additional duty of confining the bearing-block within the pocket H. This part of the invention is especially applicable to shafts which have to be removed from their bearings from time to time.

The shaft G is plain throughout, with the exception of the spherical enlargement at one end only; the outer bearing for the opposite end of the shaft being such as to permit the raising of the bearing-block from the pocket H, when the shaft will assume an inclined position and can be withdrawn from its outer bearing, and will then be free, so that the bearing-block, deprived of its follower, can be driven along the shaft and from the end of the same.

Figure 4:
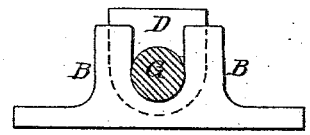

As regards the pocket H for receiving the bearing-block, it may be in a bracket or in a pedestal, as shown in Fig. 4, or in any other attachment to or part of a machine which circumstances may suggest, and which I include in the general term "hanger."

I claim as my invention—

1. The combination of a hanger having a pocket, H, with the bearing-block D, adapted to but removable from said pocket, and the shaft G, the end of which has its bearing in the block, as set forth.

2. The combination of a hanger having a pocket, H, with the bearing-block D, adapted to but removable from said pocket, the shaft G, having a spherical end adapted to a bearing in the block, and the follower $q$, whereby the shaft is confined to the block, as set forth.

3. The combination of the hanger having a pocket, H, and set-screw $w$ with the shaft G, having a spherical end, $p$, the bearing-block D, adapted to but removable from the said pocket, the follower $q$, and means for confining the same to the block, substantially as set forth.

4. The combination of a frame, A, having flanges $a$ and $b$, the hanger having a portion, $d$, bearing against the flange $b$, the set-screws $n$, $n'$, and $m$, whereby the hanger is confined to the flange $a$, and the bolt $f$, whereby the hanger is confined to the flange $b$, as set forth.

In testimony whereof I have signed my name to this specification in the presence of two subscribing witnesses.

MERRILL A. FURBUSH.

Witnesses:
JOHN CLAYTON,
HARRY SMITH.